(12) United States Patent
Krachler et al.

(10) Patent No.: US 9,132,724 B2
(45) Date of Patent: Sep. 15, 2015

(54) COUPLING BETWEEN A REPLACEABLE BATTERY AND A VEHICLE

(75) Inventors: Gerhard Krachler, Grosspesendorf (AT); Martin Rodler, Krottendorf (AT)

(73) Assignee: MAGNA STEYR Fahrzeugtechnik AG & Co KG, Graz (AT)

( * ) Notice: Subject to any disclaimer, the term of this patent is extended or adjusted under 35 U.S.C. 154(b) by 510 days.

(21) Appl. No.: 13/635,413

(22) PCT Filed: Mar. 18, 2011

(86) PCT No.: PCT/EP2011/054152
§ 371 (c)(1),
(2), (4) Date: Sep. 15, 2012

(87) PCT Pub. No.: WO2011/113940
PCT Pub. Date: Sep. 22, 2011

(65) Prior Publication Data
US 2013/0285444 A1    Oct. 31, 2013

(30) Foreign Application Priority Data
Mar. 19, 2010  (DE) .......................... 10 2010 012 096

(51) Int. Cl.
*B60K 1/04* (2006.01)
*H01R 13/518* (2006.01)
*H01R 13/631* (2006.01)
(Continued)

(52) U.S. Cl.
CPC ................ *B60K 1/04* (2013.01); *H01R 13/518* (2013.01); *H01R 13/631* (2013.01); *B60K 2001/0438* (2013.01); *B60K 2001/0455* (2013.01); *B60K 2001/0472* (2013.01); *H01R 13/005* (2013.01); *H01R 2201/26* (2013.01); *Y02T 90/124* (2013.01)

(58) Field of Classification Search
USPC ....................................................... 307/10.1
See application file for complete search history.

(56) References Cited

U.S. PATENT DOCUMENTS

| 5,360,307 A | 11/1994 | Schemm et al. |
| 5,622,602 A | 4/1997 | Yakabe et al. |

(Continued)

FOREIGN PATENT DOCUMENTS

| CN | 1695275 A | 11/2005 |
| CN | 101327727 A | 12/2008 |
| JP | 2009252656 A | 10/2009 |

OTHER PUBLICATIONS

Chinese Patent Application No. 201180014686.4 First Office Action, Aug. 22, 2014, p. 1, The Patent Office of the People's Republic of China, Beijing, China. (English Abstract submitted).

(Continued)

*Primary Examiner* — Robert Deberadinis
(74) *Attorney, Agent, or Firm* — Jordan IP Law, LLC; Todd A. Vaughn

(57) ABSTRACT

A coupling between a replaceable battery and a vehicle in order to produce an electrical contact between the battery and a vehicle electrical system. The coupling includes at least one vehicle-side coupling part and at least one battery-side coupling part, each coupling part having at least one electrical contact site. The contact sites of the coupling parts that are separate from each other until the battery is mechanically fastened to the vehicle can be brought into mutual contact after the battery has been mechanically fastened to the vehicle.

20 Claims, 2 Drawing Sheets

(51) Int. Cl.
   *B60L 1/00* (2006.01)
   *H01R 13/00* (2006.01)

(56) References Cited

U.S. PATENT DOCUMENTS

2005/0208832 A1    9/2005    Litz

2010/0112843 A1*   5/2010    Heichal et al. ............... 439/299

OTHER PUBLICATIONS

Tian Lili, Chinese Patent Application No. 201180014686.4 Search Report, Jul. 30, 2014, pp. 10-11, Department of Mechanical inventions under Patent Examination Cooperation Jiangsu Center, China. (English Abstract submitted).

* cited by examiner

US 9,132,724 B2

COUPLING BETWEEN A REPLACEABLE BATTERY AND A VEHICLE

CROSS-REFERENCE TO RELATED APPLICATIONS

The present application is a National Stage Application of PCT International Application No. PCT/EP2011/054152 (filed on Mar. 18, 2011), under 35 U.S.C. §371, which claims priority to German Patent Application No. 10 2010 012 096.0 (filed on Mar. 19, 2010), which are each hereby incorporated by reference in their respective entireties.

FIELD OF THE INVENTION

The invention relates to a coupling between a replaceable battery and a vehicle in order to produce an electrical contact between the battery and a vehicle electrical system, wherein the coupling comprises at least one vehicle-side coupling part and at least one battery-side coupling part, each coupling part having at least one electrical contact site. In addition, the invention relates to a vehicle having an electrical drive.

BACKGROUND OF THE INVENTION

A method and a device for replacing a battery of a vehicle having an electrical drive are known from U.S. Pat. No. 5,622, 602A. In so doing, the vehicle comprises an interface to a battery. In accordance with the technical doctrine of the known document, the battery is electrically connected to the vehicle electrical system prior to the battery being installed in the vehicle. As a result, this has the disadvantage that it is considerably more difficult to install the battery, wherein there is also the risk of the electrical contact being damaged.

SUMMARY OF THE INVENTION

It is, therefore, an object of the invention to simplify the installation and/or the replacement of a battery of a vehicle having an electrical drive.

This and other objects is achieved in accordance with the invention with a coupling of the type mentioned in the introduction by virtue of the fact that the contact sites of the coupling parts are separate from each other until the battery is mechanically fastened to the vehicle and said contact sites can be brought into mutual contact after the battery has been mechanically fastened to the vehicle.

In the case of the solution in accordance with the invention, the procedures of coupling the coupling and consequently of providing an electrical contact to the battery are only performed after mounting the battery. As a consequence, the following advantages are provided.

During and immediately after mounting the battery, the battery is not electrically connected to the vehicle electrical system. Also, any redundant geometric dimensioning and/or damage to the coupling as a result of tolerance problems during the mounting procedure are avoided. Also, the coupling direction and consequently the position of the coupling can be freely selected, since they are no longer influenced by the direction in which the battery is mounted.

Preferably, the coupling is a multi-coupling. In other words, all the connections for operating the battery, such as cooling fluid connections, data transfer connections, etc. are mutually connected by way of the coupling.

In accordance with an advantageous variant of the invention, the mutually associated electrical contact sites of the coupling parts each form a plug-in connection. This embodiment of the invention is characterized, above all, by a high level of reliability when closing the contacts.

Any unintentional and accidental mutual contacting of the electrical contacts can be reliably prevented by virtue of the fact that the vehicle-side coupling part is loaded with a restoring force that acts in the opposite direction of the coupling direction. The restoring force renders it possible to ensure that the coupling parts are at a mutually spaced disposition. In order to bring together the coupling parts, it is then necessary to overcome the restoring force.

A development of the invention that is characterized by being particularly strong and simple to achieve provides that the vehicle-side coupling part comprises at least one return spring that generates the restoring force.

In so doing, it has proven to be particularly advantageous, in order to achieve a defined direction and amount of the restoring force, that the return spring is embodied as a helical spring that is guided on a spring spigot.

It is particularly favorable with respect to the mounting procedure and operational safety, if the coupling parts can be screwed one to the other and the electrical contact is produced by means of screwing into place the coupling parts. By virtue of the fact that the coupling parts are screwed into place, it is possible to reduce vibrations and the resulting micro-movements and consequently to reduce the wear on the electrical plug-in connections.

In addition, it is possible to arrange at least one switch on at least one of the coupling parts, which switch can be actuated when connecting the electrical contact sites. The arrangement of a switch renders it possible to realize different options for monitoring the coupling. Thus, the at least one switch can be connected to an output unit, at which the status of the electrical connection is indicated. In addition to monitoring the production of a correct electrical connection, it would also be possible by means of the switch to detect any unintentional separation of the coupling parts from each other. Thus, in the event of the coupling parts moving away from each other, a switch that is for example spring-loaded could trigger and interrupt or close a monitoring circuit, following which a corresponding warning could be generated for the driver.

The above mentioned object can also be achieved in accordance with the invention with a vehicle of the type mentioned in the introduction, by virtue of the fact that it comprises a coupling as claimed in any one of claims 1 to 9 and the coupling is arranged in the region below a passenger footwell, wherein a service orifice that is provided with a cover is arranged above the coupling and the coupling can be accessed by way of said service orifice.

The procedure of mounting the battery on the vehicle can be considerably simplified by virtue of the fact that at least two, preferably at least three, conical positioning aids are arranged on the battery, wherein receiving devices for these positioning aids are provided on the vehicle. This variant of the invention renders it possible in a simple manner to position the battery correctly on the vehicle.

In accordance with a further preferred variant of the invention that is characterized by being easy to handle and simple to mount, the battery can be screwed to the vehicle.

BRIEF DESCRIPTION OF THE DRAWINGS

The invention together with further advantages is explained in detail hereinunder with the aid of some non-limiting exemplary embodiments that are illustrated in the drawings, in which schematically.

DETAILED DESCRIPTION OF EMBODIMENTS

Figure 1:
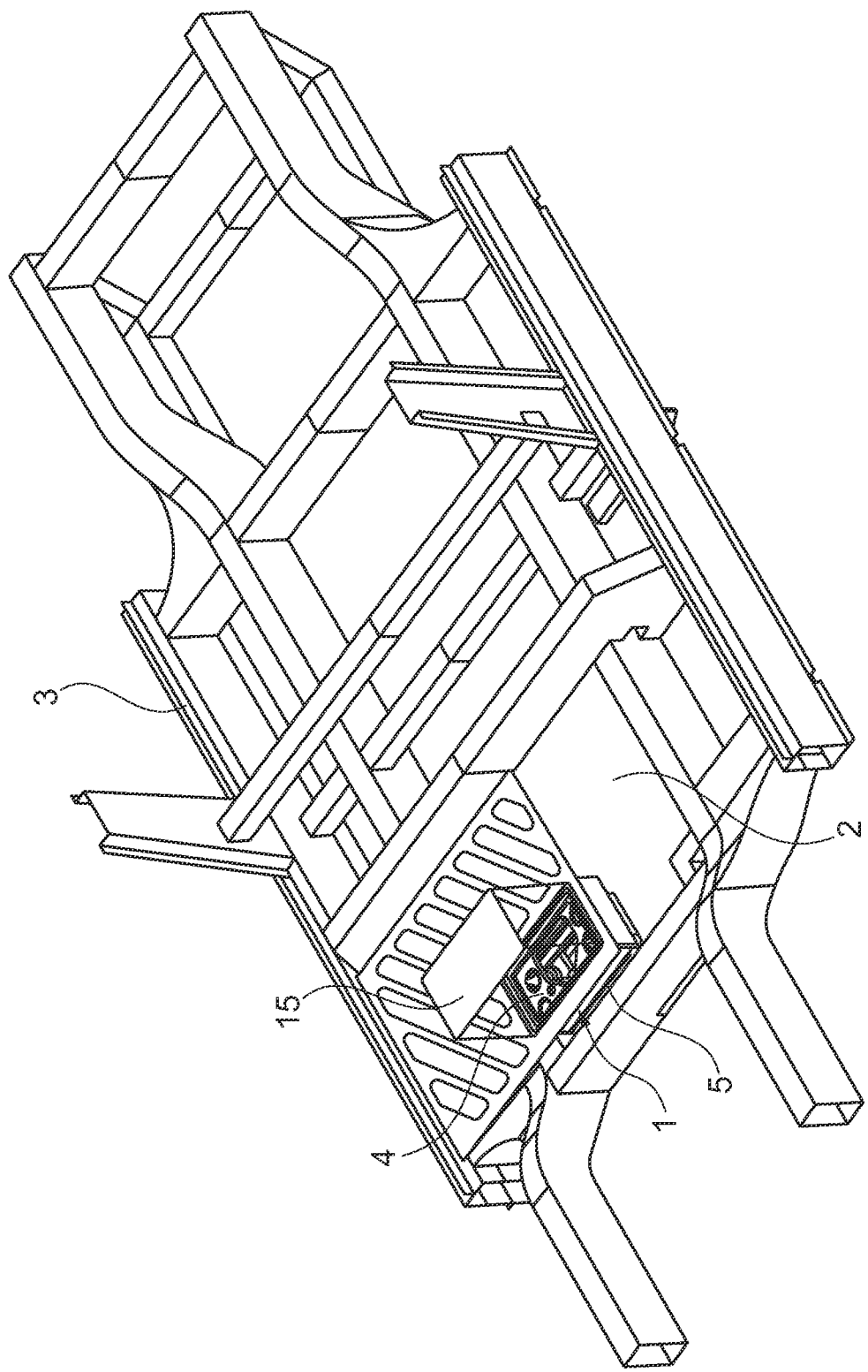
FIG. 1 illustrates a vehicle frame having a service orifice below which the coupling is arranged.

The figures are comprehensively described and like reference numerals in the figures designate the same components.

In accordance with FIG. 1, a coupling 1 is provided between a replaceable battery 2 and a vehicle 3 in order to produce an electrical contact between the battery 2 and a vehicle electrical system. The battery 2 can be fastened to the vehicle 3 by means of screws. In order to simplify the procedure of mounting the battery, the battery 2 can comprise two, three or more conical positioning aids, wherein receiving devices for these positioning aids are provided on the vehicle 3.

Figure 2:
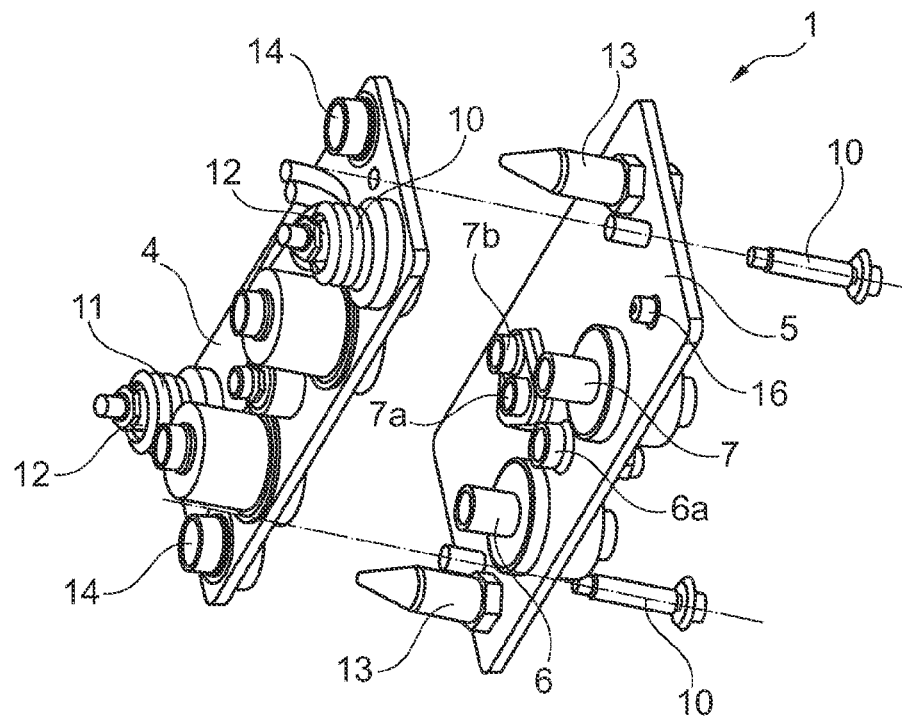
FIG. 2 illustrates a perspective view of the coupling of FIG. 1.
Figure 3:
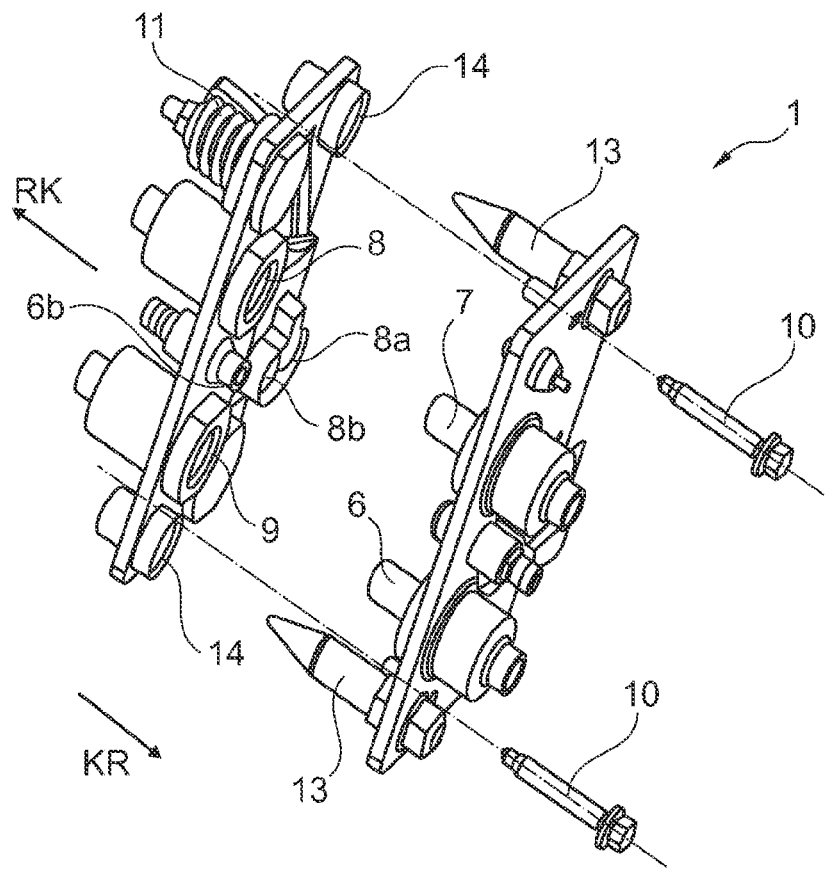
FIG. 3 illustrates a further perspective view of the coupling of FIG. 1.

As is clearly evident in FIGS. 2 and 3, the coupling 1 comprises a vehicle-side coupling part 4 and a battery-side coupling part 5 having in each case at least one electrical contact site 6, 7, 8, 9. Up until the battery 2 is mechanically fastened to the vehicle 3, the contact sites 6, 7, 8, 9 of the coupling parts 4, 5 are separate from each other. The contact sites 6, 7, 8, 9 are brought into mutual contact only after the battery 2 has been mechanically fastened to the vehicle 3. Consequently, the battery 2 and the vehicle 3 are not electrically connected during and immediately following the mounting of the battery on the vehicle.

The connection for the power transfer, data transfer and cooling medium circuit is only produced by connecting the coupling parts 4 and 5, wherein the cooling medium circuit connection sites 6, 7, 8, 9, the data transfer connections 6a, 6b and the electrical contact sites 7a, 7b, 8a, 8b are mutually connected. The mutually associated electrical contact sites 7a, 7b, 8a, 8b of the coupling parts 4, 5 can each form a plug-in connection.

In the variant of the invention illustrated in FIG. 2, the coupling 1 is secured by means of screws 10. In so doing, the connection for the power transfer, data transfer and cooling medium circuit is only produced by screwing in place the coupling parts 4 and 5.

In addition, it is of advantage if the vehicle-side coupling part 4 in an uncoupled position is at a spaced disposition with respect to the battery-side coupling part 5. This spaced disposition can be achieved by subjecting the vehicle-side coupling part 4 to a restoring force RK that acts in the opposite direction to the coupling direction KR. In order to generate the restoring force, the coupling part 4 can comprise a return spring 11, for example, a helical spring that is arranged around a spring spigot 12.

The screw movement of the screws 10 of the coupling 1 causes the vehicle-side coupling part 4 to be drawn towards the battery-side coupling part 5 against the restoring force RK and causes the coupling 1 to close. In order to make it easier to bring the coupling parts 4 and 5 together, one or a plurality of guide spigots 13 is/are provided on one of the coupling elements 4, 5. The guide spigots 13 engage in receiving devices 14 of the other coupling part 4, 5.

In addition, a switch 16 can be arranged on one of the coupling parts 4, 5, which switch can be actuated when connecting the electrical contact sites 7a, 7b, 8a, 8b. The switch can be connected to the output unit, at which the status of the electrical connection is indicated.

As is further evident from FIG. 1, the coupling 1 is arranged in the region below a passenger footwell, wherein a service orifice that is provided with a cover 15 is arranged above the coupling 1 and the coupling 1 can be accessed by way of said service orifice.

Although embodiments have been described herein, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

LIST OF REFERENCE NUMERALS

Coupling 1
Battery 2
Vehicle 3
Coupling part 4
Coupling part 5
Cooling circuit connection site 6
Data transfer connection 6a, 6b
Cooling circuit connection site 7
Electrical contact site 7a, 7b
Cooling circuit connection site 8
Cooling circuit connection site 9
Electrical contact site 8a, 8b
Screw 10
Return spring 11
Spring spigot 12
Guide spigot 13
Receiving device 14
Cover 15
Switch 16

What is claimed is:

1. A coupling between a replaceable battery and a vehicle, the coupling comprising:
    at least one vehicle-side coupling part which is subjected to a restoring force that acts in an opposite direction to a coupling direction, and at least one battery-side coupling part, each coupling part having at least one electrical contact site,
    wherein in a first position in which the replaceable battery is not mechanically fastened to the vehicle, the at least one electrical contact sites of the coupling parts are separate from each other, and in a second position in which the replaceable battery is mechanically fastened to the vehicle, the at least one electrical contact sites of the coupling parts are in mutual contact, and the vehicle-side coupling part.

2. The coupling of claim 1, wherein the electrical contact sites of the coupling parts each form a plug-in connection.

3. The coupling of claim 1, wherein the vehicle-side coupling part comprises at least one bias mechanism that generates the restoring force.

4. The coupling of claim 3, wherein the bias mechanism comprises a spring.

5. The coupling of claim 4, the spring comprises a helical spring that is guided on a spring spigot.

6. The coupling of claim 1, wherein the coupling parts are configured for mechanical coupling to each other.

7. The coupling of claim 6, wherein the mechanical coupling produces the electrical contact.

8. The coupling of claim 1, further comprising at least one switch arranged on at least one of the coupling parts.

9. The coupling of claim 8, wherein the at least one switch is configured for actuation when the electrical contact sites are connected.

10. The coupling of claim 9, wherein the at least one switch is connected to an output unit, at which the status of the electrical connection is indicated.

11. The coupling of claim 1, further comprising at least one guide spigot on at least one of the coupling elements that cooperates with a corresponding receiving device of the other coupling element.

12. The coupling of claim 1, wherein the coupling between the replaceable battery and the vehicle is configured to produce an electrical contact between the replaceable battery and an electrical system of the vehicle.

13. A vehicle comprising:
an electrical drive;
an electrical system;
a battery;
a coupling provided spatially below a passenger footwell of the vehicle and which provides a mechanical fastening between the battery and the vehicle to produce an electrical contact between the battery and the electrical system, the coupling including at least one vehicle-side coupling part and at least one battery-side coupling part, each coupling part having at least one electrical contact site; and
a service orifice having a cover is arranged spatially above the coupling and which permits access to the coupling,
wherein in a first position in which the battery is not mechanically fastened to the vehicle, the at least one electrical contact sites of the coupling parts are separate from each other, and in a second position in which the battery is mechanically fastened to the vehicle, the at least one electrical contact sites of the coupling parts are in mutual contact.

14. The vehicle of claim 13, further comprising:
a plurality of positioning devices provided on the battery; and
a plurality of receiving devices which correspond to the positioning devices and provided on the vehicle.

15. The vehicle of claim 13, wherein:
the vehicle-side coupling part is subjected to a restoring force that acts in an opposite direction to a coupling direction; and
the vehicle-side coupling part comprises at least one bias mechanism guided on a spigot and that generates the restoring force.

16. The vehicle of claim 13, wherein:
the coupling parts are configured for mechanical coupling to each other; and
the mechanical coupling produces the electrical contact.

17. The vehicle of claim 13, further comprising at least one switch is arranged on at least one of the coupling parts.

18. The vehicle of claim 17, wherein:
the at least one switch is configured for actuation when the electrical contact sites are connected; and
the at least one switch is connected to an output unit, at which the status of the electrical connection is indicated.

19. The vehicle of claim 13, further comprising at least one guide spigot on at least one of the coupling elements that cooperates with a corresponding receiving device of the other coupling element.

20. A vehicle, the vehicle comprising:
an electrical drive;
an electrical system;
a replaceable battery; and
a coupling to provide a mechanical fastening between the replaceable battery and the vehicle which produces an electrical contact between the replaceable battery and the electrical system, the coupling including:
at least one vehicle-side coupling part having at least one vehicle-side electrical contact site, and which is subjected to a restoring force that acts in an opposite direction to a coupling direction; and
at least one battery-side coupling part having at least one battery-side electrical contact site,
wherein in a first position in which the replaceable battery is not mechanically fastened to the vehicle, the at least one vehicle-side electrical contact site and the at least one battery-side electrical contact sites are separate from each other, and in a second position in which the replaceable battery is mechanically fastened to the vehicle, the at least one vehicle-side electrical contact site and the at least one electrical contact sites are in mutual contact.

* * * * *